March 18, 1924.

J. F. MONAHAN

STORAGE BATTERY

Filed May 1, 1920

1,486,985

Witnesses:
N. L. Fisher
William A. Hardy

Inventor:
James F. Monahan
by Delos Holden
his Atty.

Patented Mar. 18, 1924.

1,486,985

UNITED STATES PATENT OFFICE.

JAMES F. MONAHAN, OF EAST ORANGE, NEW JERSEY, ASSIGNOR TO EDISON STORAGE BATTERY COMPANY, OF WEST ORANGE, NEW JERSEY, A CORPORATION OF NEW JERSEY.

STORAGE BATTERY.

Application filed May 1, 1920. Serial No. 378,176.

*To all whom it may concern:*

Be it known that I, JAMES F. MONAHAN, a citizen of the United States, and a resident of East Orange, in the county of Essex and State of New Jersey, have made certain new and useful Improvements in Storage Batteries, of which the following is a description.

My invention relates to improvements in storage batteries, and has been designed more particularly for use in connection with storage batteries of the Edison type wherein insoluble active materials are employed in an alkaline electrolyte, although it will be understood that the invention is applicable for use with storage batteries of other types.

One of the objects of my invention is to provide an improved simple and efficient valve for permitting the escape of gases generated within a battery cell, for separating from the escaping gases any globules of the electrolyte which may be mechanically entrained therewith and returning the same to the cell, for excluding dust, dirt and other foreign matter from the cell and for preventing the explosion of any of said gases within the cell from sources outside the latter.

Another object of my invention is to provide a valve of this character the construction of which is such as to effectually prevent the escape of any appreciable quantity of electrolyte from the cell through the valve irrespective of the position of the cell.

My invention further resides in the construction of parts and combinations of elements hereinafter more particularly described and claimed.

In order that my invention may be more clearly understood, attention is directed to the drawing accompanying and forming a part of this specification and in which.

Figure 1:
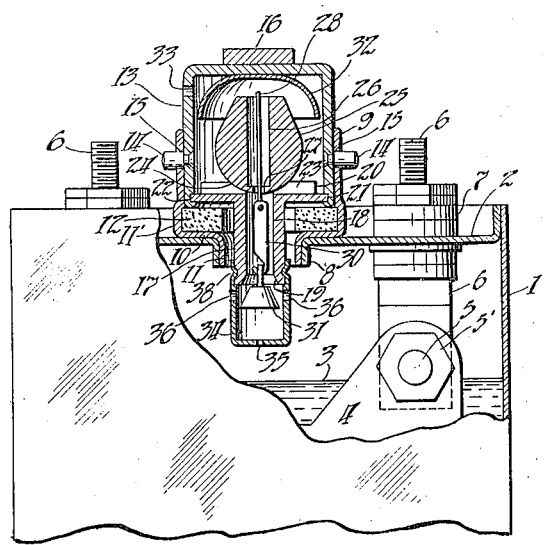
Figure 1 is a central sectional view, partly in side elevation, of the upper end portion of a storage battery cell provided with a preferred form of gas valve in accordance with my invention.

Referring to the drawing, reference character 1 represents the can or container of a storage battery cell, said container preferably being rectangular in form and having the top 2 thereof suitably secured to the vertical walls with a fluid-tight joint, as by welding, and preferably being formed of thin sheet steel which has been carefully nickel-plated so as to prevent oxidization, particularly in an alkaline solution. Obviously materials other than nickel-plated sheet steel can be employed for the container, if desired. The usual electrode plates or elements 4 are disposed in a suitable electrolyte 3, within the container 1; the positive and negative plates or elements being respectively mechanically and electrically connected, as by means of bolts 5 and nuts 5', to two poles 6, 6 which extend through fluid-tight stuffing boxes 7 secured to the top 2 of the container.

The top 2 of the container is provided with a central opening surrounded by an annular depending flange 8; and a cylindrical casing 9 provided with an upper open end, has its bottom 10 welded to the top 2 and an annular flange 11 depending from said bottom and surrounding a central opening therein, extending within and welded to the annular flange 8. The cylindrical casing 9 has a slightly enlarged lower end portion 11', and a ring or annulus 12 of soft rubber or other resilient material, is seated and fits tightly in such enlarged portion 11'. A hollow cylindrical member or casing 13 open at its lower end, is disposed and fits closely within the casing 9 and is suitably removably secured thereto as by means of a bayonet joint connection comprising a pair of pins 14, 14 suitably secured to the casing 13 and extending laterally therefrom, and a pair of bayonet slots 15, 15 provided in casing 9 and respectively receiving the pins 14, 14. The slots 15, 15 are so formed that the closed locking end portions thereof are slightly above the lowermost and immediately preceding portions, the construction and arrangement being such that when the casings 9 and 13 are locked together by the bayonet joint connection, as shown, the resilient ring 12 will tightly engage the lower end of the casing 13, forming a fluid-tight joint therewith, and will coact therewith to yieldingly hold the said casings 9 and 13 thus locked together. It will be obvious that to either lock the casings 9 and 13 together or to unlock the same, it will be necessary to force the casing 13 below the position shown in Figs. 1 and 2, against the resiliency of the ring 12, and in order to facilitate these operations a member 16 hexagonal in form and adapted to be engaged by a suitable tool, is secured as by welding, to the top of casing 13. When casings 9 and 13 are locked together, the casing 13 extends a considerable distance above the upper end of casing 9, as shown.

Figure 3:
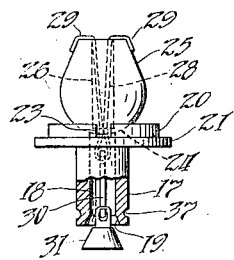
Fig. 3 is a detailed view, partly in elevation and partly in section, of the gas valve shown in Fig. 1.
Figure 2:
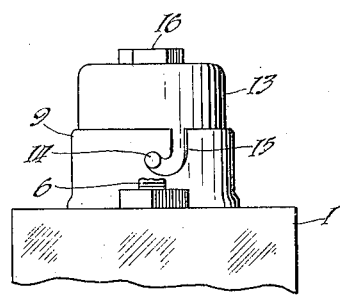
Fig. 2 is a view in end elevation, partly broken away, of the structure shown in Fig. 1.

Reference character 17 represents a tubular member preferably comprising a main cylindrical portion having an axial opening therethrough, and provided with a valve seat 19 at the lower end thereof about the opening 18 and with an annular flange or collar 20 at its upper end. The flange or collar 20 has a reduced annular rim 21 which extends into a shallow annular groove 22 formed on the inside of the casing 13 adjacent its lower end and is secured therein by peaning over the lower end of such casing. The tubular member 17 is thus rigidly secured to the casing 13 and extends downwardly therefrom through the openings in ring 12, the bottom 10 of casing 9 and the top 2 of container 1 into the upper end portion of the latter. The flange 20 is provided on its upper face with a diametrical slot or groove 23 intersecting the opening 18 and with a central spherical seat 24 which is slightly less in depth than the groove or slot 23. A weight 25 having a spherical lower end portion and an upper frusto-conical portion is loosely supported on the flange 20 and is provided with an axial cylindrical opening 26 therethrough, the lower end portion of said opening being reduced as indicated at 27. A wire 28 or a like flexible member extends loosely through the opening 26 in weight 25 and is supported from the weight by having its end portions 29, 29 bent over the top of the weight and then downwardly below said top. The central portion of the wire 28 forms a loop and the wire is of such length that this loop extends a slight distance below the lower spherical end portion of the weight. A link 30 is supported from the said loop, the wire 28 passing loosely through an opening provided in the link adjacent its upper end. The link 30 is formed with a hook at its lower end on which a valve 31 is supported, the latter being provided with an eye in which the said hook loosely engages. The valve 31 conforms to valve seat 19 and the lower spherical end portion of weight 25 conforms to the spherical seat 24. If the cell is in a vertical or its normal position, the tubular member 17 will also be in vertical position and the weight 25 will be in the position shown with the lower spherical end portion thereof engaging the spherical seat 24 and with the opening 26 in vertical alignment with the opening 18 of the tubular member 17. The valve 31 will then be supported from the weight by means of the wire 28 and link 30 in open position a slight distance below the valve seat 19, as shown in Figs. 1 and 3. An inverted cupped member 32 is suitably secured directly above the weight 25 to the underside of the top of casing 13 as by being welded thereto, this cupped member being of such size that its lower edge extends below the top of the weight 25 in close proximity to the wall of the casing 13. The casing 13 is provided with an opening 33 at a point above the lower edge of the top member 32. A small hollow cylindrical member or casing 34 having its upper end open and provided with small openings 35 and 36 in its bottom and side walls respectively, is rigidly secured to the tubular member 17 so as to enclose the valve 31, as by having the upper end portion of its side wall crimped into an annular groove 37 formed on the lower end portion of said tubular member as indicated at 38.

When the cell is in vertical position, the parts of my improved gas valve will occupy the positions shown and gases generated within the cell will be free to pass or escape therefrom through the gas valve in the following path: Through the openings 35 and 36 of the casings 34, the opening 18 of tubular member 17, and the slot 23 beneath the lower spherical end of the weight 25 into the casing 13, then up through the very narrow space between the edge of the cupped member 32 and the side wall of the casing 13 and out through the opening 33 to the atmosphere. A portion of these gases also passes from the opening 18 in tubular member 17 through the opening 26 of the weight 25, and is then deflected downwardly by the cupped member 32 and passes around the edge thereof and then upwardly through the very small space between said edge and the side wall of casing 13 and out through the opening 33. Practically all of the globules of the electrolyte entrained with these gases will be separated therefrom in thus passing from the cell by reason of the tortuous paths thereof through the gas valve, the various elements in the path of the gases and the small spaces through which the same are caused to flow, especially the small spaces between the lower spherical end of the weight 25 and the bottom of groove 23 and between the lower edge of the cupped member 32 and the side wall of casing 13. The electrolyte thus separated from the escaped gases will flow down the inner surfaces of cupped member 32, the side wall of casing 13, and the wall of opening 26 in the weight 25 and then down through the opening 18 of the tubular member 17 into the small casing 34 from whence it will return to the cell through the small opening 35 in the bottom of such casing.

When the cell is moved or tipped from the the vertical position shown, the weight 25 will tend to move by gravity from its seat 24 and the construction may be such that the tipping of the cell to any angle desired will effect such movement of the weight 25. Preferably, however, the parts are so constructed and arranged that the movement of weight 25 from its seat will be effected when the cell is tipped through an angle of 45 degrees from the vertical. This movement of the weight 25 from its seat will by reason of the wire 28 and link 30, which connect the weight to the valve 31, automatically raise the valve 31 to its seat 19, that is, to closed position, and prevent the escape of any of the electrolyte from the container 1 through the gas valve. In case the container is tipped or inverted so quickly that a small amount of the electrolyte escapes through the opening 18 of tubular member 17 and opening 26 of weight 25 before the valve 31 is closed, this electrolyte will be caught by the cupped member 32 and returned to the cell container 1 when the latter is again moved to its normal vertical position. The small casing 34 will serve to catch the valve 31 in case the same becomes disconnected from the weight 25 and thereby prevents the possibility of the latter dropping between the electrode plates or elements of the cell and short-circuiting the latter.

While I have specifically shown and described the preferred embodiment of my invention, it is to be understood that the same is subject to many changes and modifications without departure from the spirit of the invention and the scope of the appended claims.

Having now fully described my invention, what I claim as new and desire to protect by Letters Patent of the United States, is as follows:

1. In combination, a storage battery cell and a gas valve therefor comprising a valve seat, a valve therefor and a member from which said valve is normally supported in open position, said member normally occupying a given position and movable bodily from said position when said cell is tipped from the vertical, said valve being moved to closed position by said member upon movement of the latter from its normal position, substantially as described.

2. In a storage battery cell, a vertical tubular member applied to the top of the cell container and provided with a valve seat, a valve therefor normally maintained by its own weight below said seat, and means comprising a member disposed above said seat and connected with said valve for raising the valve to closed position upon movement of said cell from a vertical position, substantially as described.

3. A gas valve for storage batteries comprising a member having an opening therethrough and provided with a valve seat about said opening at one end of the latter, a valve for said seat, and a device normally occupying a given position adjacent the other end of said opening and movable bodily from said position upon tipping said member from a vertical towards a horizontal position, said valve being normally in open position and being moved to closed position by said device upon movement of the latter from its normal position, substantially as described.

4. A gas valve for storage batteries comprising a vertical member having an opening therethrough and provided with a valve seat about said opening at its lower end, a valve for said seat, and a device normally occupying a given position adjacent the upper end of said opening and movable bodily under the action of gravity from said position when said member is tipped from a vertical towards a horizontal position, gas being free to pass through said opening and past said device when the latter is in its normal position, said valve being supported from said device normally in open position and being moved to closed position by said device upon movement of the latter from its normal position, substantially as described.

5. A gas valve for storage batteries comprising a vertical tubular member having a valve seat at its lower end, a device resting loosely on the upper end of said member, normally occupying a given position thereon and adapted to move by gravity from said position when the tubular member is tipped from a vertical towards a horizontal position, a valve for said seat, and means supporting said valve from said device in open position below said valve seat when said device is in its normal position, said means effecting closing movement of said valve upon said movement of said device, from its normal position, substantially as described.

6. A gas valve for storage batteries, comprising a member having an opening therethrough for the escape of gases, a cap applied to said member and the interior of which is in communication with said opening, and an inverted cupped member carried by the cap above said opening, the edge of said cupped member being in close proximity to the wall of said cap, said cap being provided with an opening through its wall above the edge of said cupped member, substantially as described.

7. A gas valve for storage batteries, comprising a vertical member having an opening therethrough for the escape of gases, a valve for controlling said opening, said valve being normally in open position, means for effecting the closing of said valve when said member is tipped from the vertical, a cap applied to said member and the interior of which is in communication with said opening, and an inverted cupped member carried by said cap above said opening, substantially as described.

8. A gas valve for storage batteries, comprising a cylindrical casing open at its upper end and adapted to be secured at its lower end to the top of a storage battery cell, a resilient member disposed in the lower end portion of said casing, and a cylindrical member disposed within said casing and provided with means for controlling the escape of gases therethrough from a cell to which said casing is applied, said casing and member having a bayonet joint connection, the arrangement being such that said connection, said resilient member and said cylindrical member coact to yieldingly lock said casing and cylindrical member together in fluid-tight relation, substantially as described.

9. A gas valve for storage batteries, comprising a vertical member having an opening therethrough for the escape of gases and provided with a valve seat at its lower end, a weight supported on the upper end of said member and normally positioned in a seat provided on said upper end, said weight being movable from its seat when said member is tipped from the vertical, a valve for said opening, said valve normally being in open position, and means whereby movement of said weight from its normal position effects closing movement of said valve, the upper end of said member being provided with one or more grooves communicating with said opening and deeper than the seat for said weight whereby gases are free to escape through said member when said weight is in its seat, substantially as described.

10. A gas valve for storage batteries, comprising a member having a valve seat and an opening therethrough, a rounded weight seated loosely on said member about said opening, and a valve supported by said weight, said weight acting to draw said valve toward the valve seat when the battery is moved from a vertical towards a horizontal position, substantially as described.

11. A gas valve for storage batteries, comprising a member having a valve seat and an opening therethrough, a rounded weight seated on said opening, a valve supported by said weight, said weight acting to draw said valve toward the valve seat when the battery is moved out of a vertical position, an apertured casing enclosing said weight, and an inverted cup carried by the casing above said weight, substantially as described.

This specification signed this 29th day of April, 1920.

JAMES F. MONAHAN.